3,195,369
REMOTE CONTROL DEVICE
John G. Warhol, Oak Park, Mich., assignor to Nelmor Corporation, Harper Woods, Mich., a corporation of Illinois
Filed Apr. 16, 1962, Ser. No. 187,684
12 Claims. (Cl. 74—501)

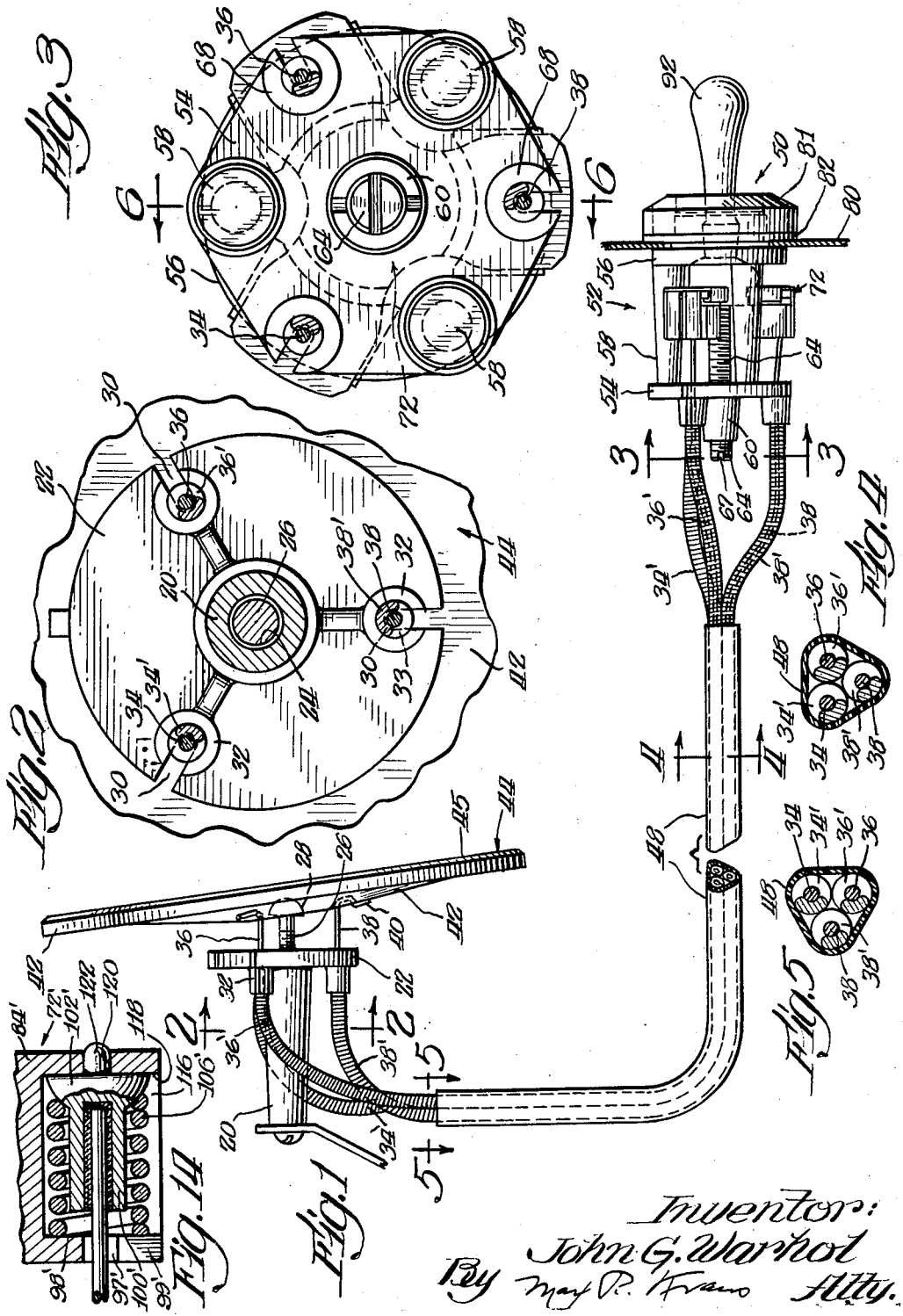

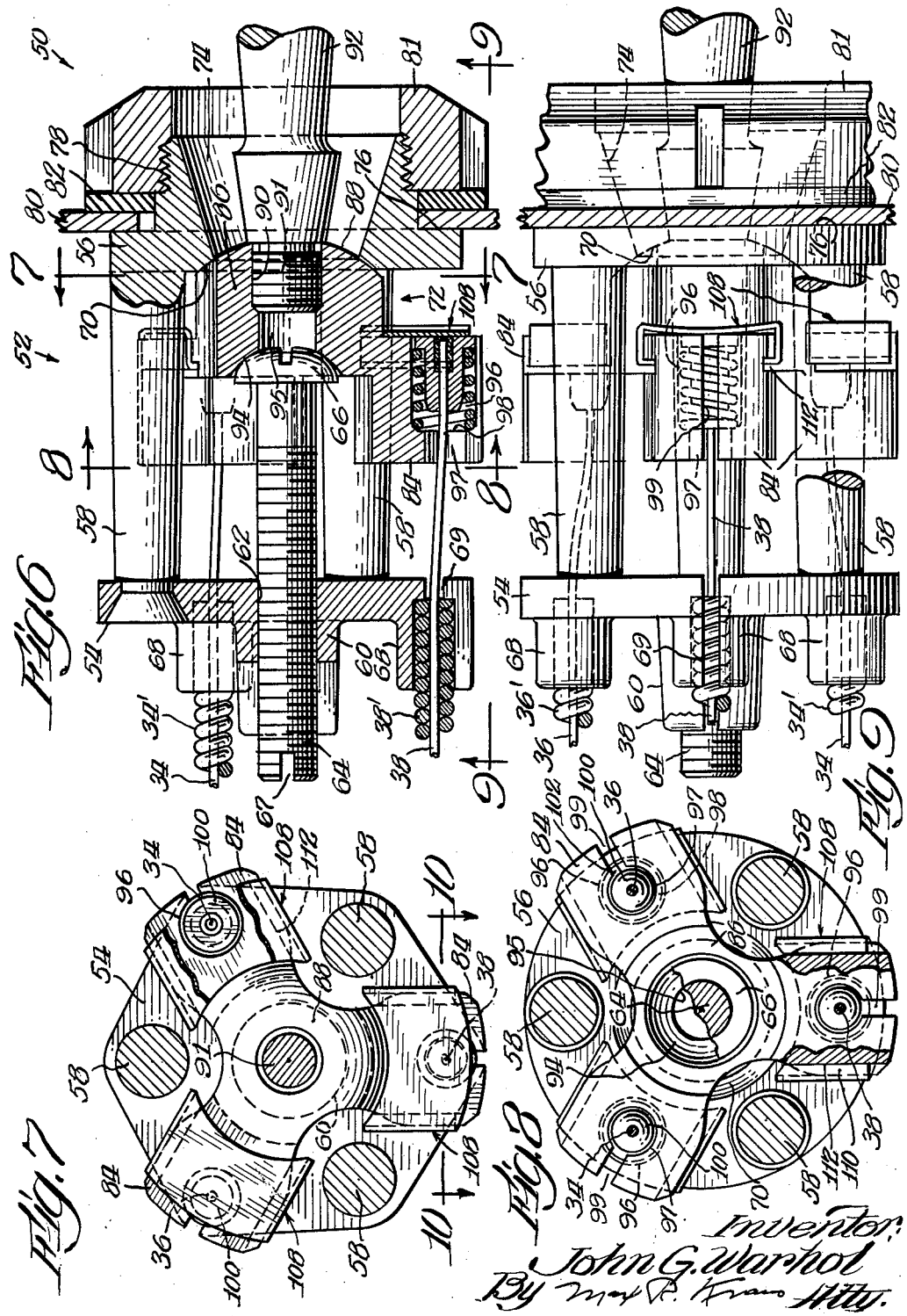

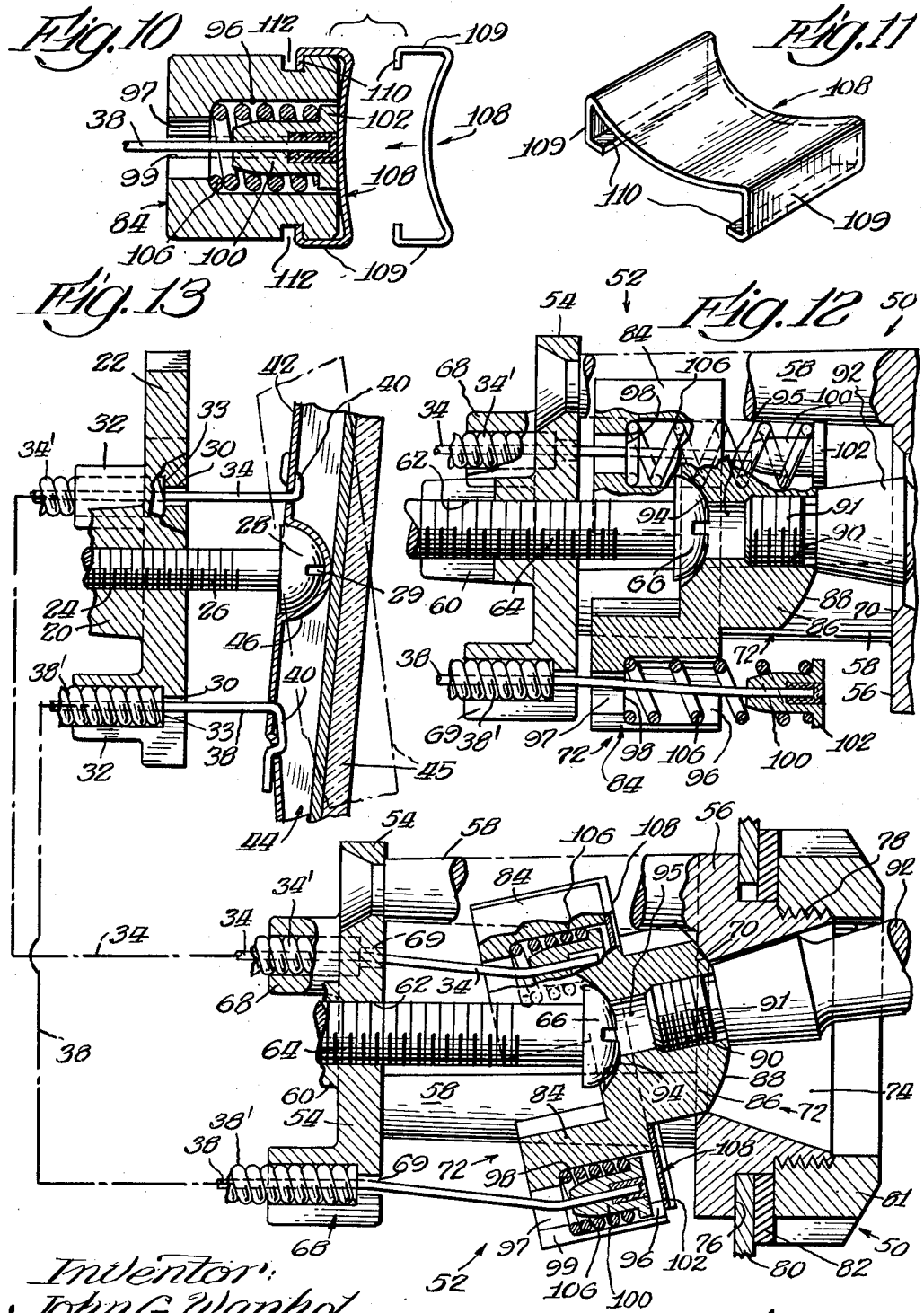

This invention relates to a remote control device, more particularly to an automobile rear view mirror which is mounted on the outside of the automobile and controlled from the inside.

One of the objects of this invention is to provide a remote control device operative by three or more cables, in which both the control member and the controlled member are pivotally mounted on supports for universal movement, and wherein spring means operatively connected to the cables apply a pull which urges the control and controlled members in a direction toward each other, and wherein spring means are eliminated from the support members.

I am aware of other remote control devices, particularly the structure exemplified in the Jacobson Patent No. 2,931,245, wherein the controlled member, namely, the mirror, is supported on an axially slidable support which is urged outwardly by means of a coiled spring and also wherein the pivotal member at the control end is pivotally supported on an axially slidable support which is spring biased, both said spring means urging their respective support members in opposite directions away from each other and correspondingly urging the controlled member and the control member in opposite directions away from each other to provide a tensioning means to the cables.

Such a construction wherein two spring forces are constantly opposed to each other results in a premature weakening of the springs and a slackening of the cables, particularly as the device is subjected to jarring during the travel of the vehicle. Since the two supports are always axially slidably supported and each is controlled by a spring, they cannot be adjusted at the said supports when the cables slacken.

An object of this invention is to overcome the disadvantages inherent in the aforementioned structure and to provide a structure in which the controlled member, or mirror member, is supported for pivotal movement on a fixed support and the pivotal member of the control unit is likewise supported for pivotal movement on a fixed support, both said supports while fixed during operation of the device are axially adjustable to provide for the proper tensioning of the cables.

Another object of this invention is to provide a device of the foregoing character in which the cables each have spring means for applying a pull of the cables against the pivotal control member to urge said pivotal control member forwardly in the direction of the controlled member, as contrasted to the device shown in the aforementioned patent in which the springs urge the pivotal control member rearwardly or away from the controlled member.

Another object of this invention is to provide a device of the foregoing character for controlling a rear view mirror in which each of the cables has secured to the end thereof a tension or spring means which creates a tension or thrust at all times against the pivot or swivel point of the controlled object, namely, the rear view mirror. The benefit derived from this mechanical force is that the mirror member, namely, the glass and case will withstand a greater degree of jolt before vibration of the mirror member is noticeable.

Another object of this invention is to provide a control in which each of the cables has a spring means at the control end, which spring means are maintained in compressed positions within their socket housings, and when the control member is swiveled or pivoted the springs individually can further compress. This provides a very positive movement as the pressure of the springs pulling are equalized and the spring and cable which is relaxing has a tendency to push the cable through the armor or cable covering. This results in the elimination of the loose or spongy action in the control handle.

Another object of this invention is to provide control means having a fixed support on which the pivotal member is supported for pivotal movement, with spring means attached to the cables and supported on the pivotal member for simultaneously pulling the cables and tensioning same and urging said pivotal member forwardly on the fixed pivotal support, with the fixed support being axially adjustable to permit ready assembly, connection and installation of the cables with respect to the pivotal member and the ready support of the pivotal member on the fixed support to permit the proper tensioning of the cables.

Other objects will become apparent as this description progresses.

In the drawings:

FIGURE 1 is a side elevational view of the complete unit forming this invention;

FIGURE 2 is a view taken on lines 2—2 of FIGURE 1;

FIGURE 3 is a view taken on lines 3—3 of FIGURE 1;

FIGURE 4 is a view taken on lines 4—4 of FIGURE 1;

FIGURE 5 is a view taken on lines 5—5 of FIGURE 1;

FIGURE 6 is a view taken on lines 6—6 of FIGURE 3;

FIGURE 7 is a view taken on lines 7—7 of FIGURE 6;

FIGURE 8 is a view taken on lines 8—8 of FIGURE 6;

FIGURE 9 is a view taken on lines 9—9 of FIGURE 6;

FIGURE 10 is a view taken on lines 10—10 of FIGURE 7;

FIGURE 11 is a perspective view of the clip member;

FIGURE 12 is a view partly in section of the control member, taken before assembly of the clip member;

FIGURE 13 is a section view taken at the controlled end, with the mirror member pivoted and operated by the control member shown in FIGURE 13A;

FIGURE 13A is a sectional view with the control member pivoted and connected to the controlled end of FIGURE 13, and FIGURE 14 is a sectional view showing modified means for securing the cable terminals to the pivotal control member.

The controlled member, which in the embodiment shown is the mirror unit, is best shown in FIGURES 1, 2 and 13 of the drawings. The mirror unit is adapted to be mounted on the fender, for example, or any desired location on the exterior of the vehicle so as to be in view of the driver and reflect the view rearwardly of the vehicle. The unit includes a bracket having an elongated body 20 having a plate 22 at the front end integrally formed therewith. The body 20 has an axial threaded bore 24 to receive a threaded support member 26 which also extends through an alined threaded opening in the plate 22. The threaded support member 26 has an enlarged semispherical shaped pivot head 28 which forms a fixed pivot support for the mirror. The threaded support member 26 is adjustable axially with respect to the body 20 and plate 22. It may be preset if desired.

The plate 22 has provided therein three openings 30 equally spaced around the axial bore 24 therein, communicating with rearwardly extending correspondingly alined sleeve portions 32 providing an internal shoulder 33. The sleeves 32 provide the sockets for receiving the terminals of the armor or covering for the cables.

There are three cables designated by the numerals 34, 36 and 38 and each cable is covered by an armor or covering 34', 36' and 38', respectively. Each cable, which may be formed of wire, is freely slidable within its respective covering. The ends of each of the cables, for connection to the mirror unit, passes through its respective sleeve 32 and corresponding plate opening and is bent to form a hook end 40 to interlock with the mirror assembly or mirror unit generally indicated at 44, by passing in and out of spaced openings provided in the back plate 42 of the mirror assembly, as best seen in FIGURE 13. The connection between the cables and the mirror are equally spaced around the axis of the mirror. The end of each armor or cable covering is confined within its respective sleeve socket. If braided cables are used, the cable may be crimped, knotted, or the like, to interlock with the mirror assembly and each cable would pass through a single hole in the back plate 42 of the mirror member 44.

The mirror assembly or mirror unit 44 has the back plate 42 which is flanged to support a reflective mirror 45. The back plate has a central portion which arches away from the reflective mirror and the center thereof corresponding to the mirror axis has a concave or socket portion 46 which engages and fits on the semi-spherical pivot head of the support member 26. Support member 26 is a fixed support for the pivotal movement of the mirror member 44.

The mirror unit is adapted to be exteriorly supported on the automobile. The mirror member, including the body 20, plate 22 and the exposed cable covering, shown in FIGURE 1 at the mirror end may be enclosed within a housing (not shown) which does not interfere with the pivotal movement of the mirror assembly or mirror unit 44. The cables and their respective coverings will extend into the interior of the car where the control assembly or control unit generally indicated at 50 is positioned. The control assembly is secured generally within easy access for the operator. Thus, by operating the control unit 50 in the car, the controlled member or mirror unit exteriorly of the car can be adjustably positioned. The three cables within their respective coverings are also enclosed within a larger flexible tubing indicated by the numeral 48, which keeps them together but does not interfere with their respective operation. The opposite ends of the cables 34, 36 and 38 are connected to the control unit 50 and same will now be described.

The control assembly or control unit, best illustrated in FIGURES 1 and 3 and FIGURES 6 to 13 inclusive, is supported in a frame generally indicated at 52 which has a front frame member 54 and a rear frame member 56 spaced therefrom and joined together by a plurality of posts 58 which are formed integrally with the rear frame 56 and extend horizontally and forwardly for connection to the front frame 54. The front frame has a forwardly extending boss 60 having an internally threaded bore 62 for receiving a threaded support member 64 having a semispherical shaped head 66. The threaded support member 64 is axially adjustable relative to the front frame and remains fixed relative thereto after being adjusted. The end of the threaded member 64 is slotted as at 67, best seen in FIGURE 1, and extends forwardly of boss 60 to be engaged by a screwdriver for axial adjustment of support member 64.

The frame member 54 (see FIGURES 3 and 6) has three equally spaced radially disposed forwardly extending sleeve portions 68 which form sockets for the ends of the cable coverings, as best seen in FIGURES 6 and 13. The cables extend through aligned openings 69 for attachment to the pivotal control member, to be described. The rear frame member 56 is provided with a centrally positioned concave surface 70 which forms the seat or socket for the pivotal control member generally indicated at 72. The rear frame member 56 has an opening 74 extending rearwardly of the socket 70, which opening diverges rearwardly. The rear frame member has a shoulder 76 and is externally threaded as at 78. The threaded end 78 extends through an opening in the panel 80 of the vehicle and is secured thereto by a nut 81 and washer 82.

The pivotal control member 72 is pivotally supported on the threaded support member 64 within the frame 52 for pivotal movement in the socket 70 of the rear frame 56. The pivotal member 72 has three radially equally spaced front sections or arms 84 which merge into a rearwardly extending extension 86 having a semi-spherical shaped rear face 88 which pivots in socket 70 of the rear frame. The extension 86 is provided with a rearwardly extending axial threaded bore 90 to receive the threaded shank 91 of a handle 92 which extends rearwardly of the rear frame member 56 and outwardly thereof to be manually engaged by the driver, as will be subsequently described. The handle 92 moves within the enlarged outwardly tapered opening 74.

The front wall of the extension 86 has a concave seat or socket 94 in which nests the semi-spherical head 66 of the threaded support member 64 and about which head the pivotal control member 72 pivots. The seat 94 has a communicating opening 95 with the bore 90. Each of the sections or arms 84 is provided with a centrally positioned bore 96 which communicates with a reduced opening 97 at the front thereof to provide an intermediate shoulder 98. Each of the bores 96 forms a socket for receiving the ends of the cables. The three sockets 96 are radially equally spaced. Each socket 96 has a communicating slit 99 which opens outwardly to permit the cable to be inserted from the exterior through the slit.

Permanently secured to the end of each cable is a terminal or plug member 100 having an enlarged head 102 at the rear end thereof to provide a shoulder. The cable extends into the terminal or plug 100 and is anchored thereto by crimping or knotting. The terminal or plug 100 is positioned inside the socket.

Within each of the sockets 96 of the pivotal control member 72 is a coiled spring 106, one end of the spring resting against the shoulder 98 within the socket 96 and the other end resting against the head 102 of the terminal or plug 100 which is secured to the cable. As best seen in FIGURE 13A, the cable, the opposite end of which is secured to the rear view mirror, passes through the opening in the front frame member 54 and is secured to the pivotal control member 72. The covering or armor for the cable is confined within the sleeve portion 68 of the front frame member 54, as best seen in FIGURE 13A, with the end of the cable being secured to the pivotal control member 72, as described.

Each of the plugs or terminals 100 is confined within its respective socket 96 in the pivotal control member 72 by means of a spring clip 108, best shown in FIGURES 10 and 11, which is snapped over the open rear end of the socket 96. The opposite end walls 109 of the clip have inwardly directed flanges 110 which engage grooves 112 in the walls of the pivotal control member 72 for retaining the clip thereon. The central portion of the clip is bowed inwardly and engages the plug or terminal 100.

The springs 106 apply a pull or pressure against their respective cables, however, it will be noted that the springs are positioned between the pivotal control member 72 and the end of the cable, thus, the pressure is applied against the rear of the pivotal control member 72 to urge it forwardly or inwardly in the direction of the controlled member or mirror assembly 44. This pressure causes the pivotal control member 72 to seat on the semi-spherical head of the fixed support 64 and also causes the mirror assembly 44 to seat on its fixed support 26.

The terms forwardly and rearwardly as herein used are meant to designate the positions as follows. The mirror unit 44 is pivotally supported on support member 26 and the cables by virtue of the springs 106 on the cable terminals always pull the mirror unit rearwardly or inwardly toward the support member 26. The springs 106 are positioned such that the cables pull the pivotal control member 72 forwardly and inwardly toward the support member 64. This relationship always exists, irrespective of where the control and controlled units are positioned in relation to each other.

The fixed support 26 on which the mirror assembly 44 is pivotally supported is adjustable axially relative to the body 20 and plate 22 to which it is secured. The adjustment is effected by means of a screwdriver engaging the slot 29 in the head 28 and rotating same after the mirror member 24 has been removed therefrom. However, once the adjustment is effected, the support member 26 remains in a fixed position and is not movable. The same is true with respect to the pivotal support member 64 of the control member.

The threaded support member 64 is adjustable, however, once it has been adjusted it remains in its fixed position and the pivotal control member 72 pivots on the said fixed pivot support. The pressure on the cables is applied against the rear of the pivot control member 72 to urge it inwardly and forwardly against the fixed pivot support 64. In the construction of this invention, the controlled member, namely, the mirror assembly or the mirror unit 44, and the control assembly or control member 50 are urged axially toward each other and not axially away from each other.

The springs 106 operating against the cable ends have a 9 pound spring pressure and they are collapsed within their respective sockets 96 to approximately 7½ pounds. They are thus locked within their respective sockets at a given height. When the pivotal control member 72 is rotated, the springs 106 compress individually, but at no time can they expand beyond the limits of their sockets as they are confined by the clip members 108. This provides a positive movement for the controlled member because the pressure of the spring or the springs pulling are equalized and the spring and cable which are relaxing have a tendency to push the wire through the armor or covering. This results in eliminating a major portion of the spongy action in the control handle 102. The tension in this construction is derived solely from the three springs 106, each spring being secured to the end of a cable.

FIGURE 12 shows a simple manner in which the unit may be assembled and the springs 106 placed under compression. The mirror assembly or mirror member 44 is first positioned on the fixed support 26. With the parts loose, namely, where the cables or wires are not under tension, the threaded support member 64 is adjusted inwardly or forwardly by means of a screwdriver engaging the slot 68 and rotating the threaded support 64, the cables having previously been inserted in their respective sockets 96 through the slit openings 99 and the coil springs inserted on the cables with their rear ends against the plug or terminal 100. The springs 106 on the ends of the cables would therefore, while in their sockets, be expanded to their normal expanded position as when they are not compressed, and part of each of the springs would extend outwardly of the socket since they are not being retained therein by means of their respective clips 108. With this arrangement the cables would be free and positioning of the parts may be effected prior to installation. When the clips 108 are placed over the open end of the socket 96, each of the springs is compressed and locked in its respective socket, as shown in FIGURE 10.

Final adjustment for proper tensioning of the cables is effected by adjusting the fixed support member 62, as by rotating same with a screwdriver. If desired, the fixed support member 26 may be adjusted before putting the mirror member 44 thereon, which also effects the tensioning of the cables. The unit may be readily assembled and by a simple adjustment of the fixed support 64 the cables are placed under tension and the device is operative. Also, as any slackening of the cables occurs a slight rotation of the threaded support 64 will result in a tightening of the cables.

The operation of the device should be understood from the foregoing description, however, briefly described, when the handle 92 is manually grasped and operated it will pivotally move the pivotal member 72 in the socket 70 which applies a corresponding pull on the cables 34, 36 and 38, which in turn correspondingly pivots the controlled member or mirror member 44 to the desired position. The pivotal member 72 and the mirror each have a universal pivotal movement.

FIGURE 14 shows a modified construction for securing the cable terminals to the pivotal control member. The pivotal control member formerly indicated at 72 is modified only in the particular respects pointed out herein. The terminal is also modified as herein specified. With this modification the terminal may be inserted into the socket through the side opening, rather than through the rear opening as formerly.

Each of the front sections or arms 84' of the pivotal control member 72' has an enlarged recess 116 which opens outwardly to the side and the recess forms a socket for the terminal which may be inserted through the side opening. The recess 116 communicates with a reduced opening 97' at the front thereof to provide an intermediate shoulder 98'. The reduced opening 97' has a communicating slit 99' which opens outwardly or sidewise as does the recess 116. The enlarged recess has a rear end wall 118 provided with an opening 120.

Permanently secured to the end of each cable is a terminal or plug member 100' having an enlarged 102' at the rear end thereof to provide a shoulder. The cable extends into the terminal or plug 100' and is permanently anchored thereto. Extending rearwardly of the head is a pin 122. A coil spring 106' surrounds the terminal 100'.

The terminal is inserted sideways into the recess of socket 116 in the arm 84' through the open face thereof, with the cable inserted through the slit 99'. In inserting same the spring 106' is held compressed but is released inside the socket to expand within the socket, with one end of the spring resting against the shoulder 98' within the socket 96', and the other end resting against the head 102' of the terminal to urge the terminal rearwardly. The opening 120 receives the pin 122 of the terminal and prevents the terminal from falling out of the socket or recess 116. The springs 106' apply a pull or pressure against their respective cables in the same manner as heretofore described.

It will be understood that various changes and modifications may be made from the foregoing without departing from the spirit and scope of the appended claims.

What is claimed is:

1. A mechanism for remotely controlling the pivotal movement of a controlled member such as a rear view mirror through a plurality of positions about a pivot point at the controlled end, comprising a first support member pivotally supporting said controlled member for movement about said pivot point, at least three cables having one group of adjacent ends secured to said controlled member at points thereon substantially spaced from each other and from said pivot point, control means spaced from said controlled member and secured to the other adjacent ends of said cables for effecting selective movement of said cables with respect to said first support member, said first support member being axially adjustable but after adjustment remaining in a fixed position, said control means including a second support member and a pivotal member pivoting on said second support member, said second support member being adjustable axially but after adjustment remaining in a fixed position, spring means connected to the end of each of said cables and secured to said pivotal member to apply a pressure against the rear of said pivotal member to urge said pivotal member forwardly toward the controlled member and to seat on said second support member and be maintained seated by reason of said spring means.

2. A device for remotely controlling an automotive rear view mirror through a plurality of positions about a pivot point at the controlled end, comprising a fixed support member providing a pivot point at the controlled end for pivotally supporting a rear view mirror for pivotal movement about said pivot point, a control member spaced from the controlled rear view mirror, at least three cables secured to the rear view mirror and to said control member, said control member including a second fixed support, and a pivotal member pivotally supported on said second fixed support, said cables being connected to said pivotal member of said control member, spring means secured to the end of each of said cables and operatively connected to said pivotal member so that tension is applied to said cables, said springs applying pressure against the rear of said pivotal member so that said pivotal member seats on said second fixed support of said control member and always maintains same in seated position for pivoting thereabout, said spring means pulling said cables from the rear view mirror toward said pivotal member and urging said pivotal member in the direction toward the mirror.

3. A structure defined in claim 2 in which the fixed support for supporting the rear view mirror is adjustable.

4. A structure defined in claim 2 in which the second fixed support for supporting the pivotal member is adjustable.

5. A structure defined in claim 2 in which the fixed supports for pivotally supporting the rear view mirror and the pivotal member are each independently adjustable.

6. A device for remotely controlling an automotive rear view mirror through a plurality of positions about a pivot point, comprising a fixed support providing a pivot point for pivotally supporting a rear view mirror for pivotal movement about said pivot point, a control member positioned remotely from the rear view mirror for controlling the movement of the rear view mirror, said control member including a second fixed support and a member pivotally mounted on said second fixed support, at least three cables affixed to the rear view mirror at one end and affixed at their opposite ends to said pivotal member at the control end, spring means secured to each of said cables and operatively connecting same to the pivotal member at the control end so that the pivotal member is urged forwardly to a seated position on its said fixed support and always maintained in such seated position and also thereby tensioning said cables between said control member and the rear view mirror.

7. A structure defined in claim 6 in which the spring means attached to the cable at the control end are supported within sockets in the pivotal member at the control end and said springs are compressed in said sockets.

8. A remote control mechanism for controlling the pivotal movement of a controlled member, comprising in combination: a support member providing a pivotal bearing surface for supporting a controlled member for universal pivotal movement, a control member spaced from the controlled member for controlling the universal movement of the controlled member, said control member including a fixed pivotal bearing surface, a pivotal member pivotally mounted on said last mentioned fixed bearing surface, at least three cables extending between the controlled member and said control member with said cables being connected at one end to the controlled member and connected at their opposite ends to said pivotal member of said control member, a spring connected to the end of each said cable and operatively connected at said end to the pivotal member, each said spring being positioned rearwardly of the front of said pivotal member to apply a pull on said cables and pull said cables toward said pivotal member and simultaneously urge the pivotal member forwardly in the direction toward the controlled member and in the direction of the fixed pivotal bearing surface of said control member to be seated on said pivotal bearing surface and always maintained in such seated position.

9. A structure defined in claim 8 in which the fixed member providing the pivotal bearing surface for the control member is axially adjustable.

10. A structure defined in claim 8 in which the fixed pivotal member providing the bearing surface for the rear view mirror is axially adjustable.

11. A structure defined in claim 8 in which the springs are normally compressed and held in compressed condition at all times.

12. A remote control mechanism for an automotive rear view mirror, said mechanism comprising in combination a support providing a pivotal bearing surface for supporting a rear view mirror for pivotal movement about said bearing surface, a control member positioned remotely of the rear view mirror for operatively moving the rear view mirror, said control member including a fixed support member providing a pivotal bearing surface, a swivelable member swivelably mounted on said fixed support member, a handle secured to said swivelable member for controlling the movement thereof, a plurality of cables, one end of each of said cables being connected to the mirror and the other end of each of said cables being connected to said swivelable member, a spring secured to the end of each of said cables, said spring being operatively connected to said swivelable member, said cables being stressed by said springs so that they urge the mirror and said swivelable member toward each other whereby the mirror and said control member are held under tension, said springs also urging said swivelable member to seat on the pivotal bearing surface of the support of said control member and always maintain same in such seated position.

References Cited by the Examiner
UNITED STATES PATENTS

| 1,570,888 | 1/26 | Gray | 240—61 |
| 2,402,724 | 6/46 | Bidwell. | |
| 3,046,840 | 7/62 | Barcus | 74—501 X |

FOREIGN PATENTS 337,431  4/04  France.

BROUGHTON G. DURHAM, *Primary Examiner*.